United States Patent
Dry et al.

(10) Patent No.: US 10,065,540 B1
(45) Date of Patent: Sep. 4, 2018

(54) SEATING ASSEMBLY FOR VEHICLES (71) Applicant: Ford Global Technologies, LLC, Dearborn, MI (US)

(72) Inventors: Alan George Dry, Grosse Point Woods, MI (US); Marcos Silva Kondrad, Macomb, MI (US); Kevin Wayne Preuss, Berkley, MI (US); Johnathan Andrew Line, Northville, MI (US); Daniel Ferretti, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/594,981

(22) Filed: May 15, 2017

(51) Int. Cl.
*B60N 2/30* (2006.01)
*B60N 2/07* (2006.01)
*B60N 2/08* (2006.01)
*B60N 2/04* (2006.01)

(52) U.S. Cl.
CPC ......... *B60N 2/3093* (2013.01); *B60N 2/0737* (2013.01); *B60N 2/0843* (2013.01); *B60N 2/3031* (2013.01); *B60N 2/04* (2013.01); *B60N 2/30* (2013.01); *B60N 2/3079* (2013.01)

(58) Field of Classification Search
CPC .. B60N 2/3093; B60N 2/0737; B60N 2/0843; B60N 2/3031; B60N 2/04; B60N 2/30; B60N 2/3079

USPC ....................................................... 296/65.13
See application file for complete search history.

(56) References Cited

U.S. PATENT DOCUMENTS

| 4,607,884 | A | 8/1986 | Heling |
| 6,048,019 | A * | 4/2000 | Tauber ..................... B60N 2/12 248/429 |
| 6,152,533 | A | 11/2000 | Smuk |
| 6,336,679 | B1 | 1/2002 | Smuk |
| 6,499,787 | B2 | 12/2002 | Jach et al. |
| 6,629,721 | B1 * | 10/2003 | Macey ..................... B60N 2/01 296/65.13 |
| 6,955,386 | B2 | 10/2005 | Rhodes et al. |
| 7,434,883 | B2 | 10/2008 | Deptolla |
| 8,662,561 | B2 | 3/2014 | Runde et al. |
| 9,096,150 | B2 | 8/2015 | Cuddihy et al. |
| 2002/0021016 | A1 * | 2/2002 | Bergquist ................. B60N 2/01 296/65.09 |

FOREIGN PATENT DOCUMENTS

EP 1461225 B1 11/2007

* cited by examiner

*Primary Examiner* — Joseph D. Pape
(74) *Attorney, Agent, or Firm* — Vichit Chea; Price Heneveld LLP (57) ABSTRACT

A seating assembly includes a seatback operably coupled to a support structure. A seatbase is pivotably coupled to the seatback. The seating assembly is configured to slide along a slide rail in a floor to a stowed position. The slide rail has an arcuate portion.

19 Claims, 9 Drawing Sheets

SEATING ASSEMBLY FOR VEHICLES

FIELD OF THE DISCLOSURE

The present disclosure generally relates to seating assemblies. More specifically, the present disclosure relates to seating assemblies for vehicles.

BACKGROUND OF THE INVENTION

Vehicles are utilized for transporting occupants as well as cargo items. Seating assemblies in vehicles typically occupy a considerable amount of the interior cargo space in a cabin of the vehicle. Stowing the seating assemblies when not in use provides increased cargo space when the additional seating capacity is not desired. Accordingly, alternative methods and/or arrangements for stowing the seating assemblies when not in use are needed to maximize cargo space within the vehicle when the additional seating capacity is not desired.

SUMMARY OF THE INVENTION

According to a first aspect of the present disclosure, a seating assembly includes a seatback operably coupled to a support structure. A seatbase is pivotably coupled to the seatback. The seating assembly is configured to slide along a slide rail in a floor to a stowed position. The slide rail has an arcuate portion.

Embodiments of the first aspect of the present disclosure can include any one or a combination of the following features:
  the seating assembly is a vehicle seating assembly installed in a cabin of a vehicle;
  at least a portion of the seating assembly is positioned below an instrument panel of the vehicle when the seating assembly is in the stowed position;
  the stowed position of the seating assembly increases floor-level storage for in-cabin storage by at least about 400 mm when compared to a horizontally stowed seat; and
  the stowed position of the seating assembly increases a cargo space length of the cabin at a seatbase-level by at least about 150 mm when compared to a horizontally stowed seat.

According to a second aspect of the present disclosure, a vehicle seating assembly includes a seatbase pivotably coupled to a seatback. A support structure is coupled to the seatback. The support structure is configured to slidably engage with a slide rail. The slide rail has an arcuate portion that enables at least a portion of the vehicle seating assembly to be positioned below an instrument panel when in a stowed position.

Embodiments of the second aspect of the present disclosure can include any one or a combination of the following features:
  the stowed position is accomplished through horizontal and vertical movement of the vehicle seating assembly along the arcuate portion of the slide rail;
  the horizontal movement traversed by the support structure to reach the stowed position is at least about 200 mm;
  the horizontal movement traversed by the support structure to reach the stowed position is at least about 400 mm;
  the vertical movement traversed by the support structure to reach the stowed position is at least about 100 mm;
  the vertical movement traversed by the support structure to reach the stowed position is at least about 200 mm;
  the seatback travels through an arc length of at least about 20 degrees when transitioned to the stowed position; and
  the seatback travels through an arc length of at least about 30 degrees when transitioned to the stowed position.

According to a third aspect of the present disclosure, a vehicle includes a slide rail having an arcuate portion. A first-row seating assembly includes a support structure operably coupled to the slide rail, a seatback operably coupled to the support structure, and a seatbase pivotably coupled to the seatback. The seatbase pivots upward toward the seatback. The seating assembly slides along the slide rail to a stowed position that provides increased in-cabin storage.

Embodiments of the third aspect of the present disclosure can include any one or a combination of the following features:
  the vehicle further includes an instrument panel and at least a portion of the first-row seating assembly is positioned below the instrument panel when the first-row seating assembly is placed in the stowed position;
  the vehicle further includes a second-row seating assembly that slides along the slide rail to a stowed-and-stacked position that is adjacent the stowed position of the first-row seating assembly;
  the stowed-and-stacked position of the second-row seating assembly increases a cargo space length of a cabin of the vehicle at a headrest-level by at least about 200 mm when compared to a horizontally stowed seat;
  the stowed position of the first-row seating assembly increases floor-level storage for in-cabin storage by at least about 400 mm when compared to a horizontally stowed seat;
  the stowed position of the first-row seating assembly increases a cargo space length of a cabin of the vehicle at a seatbase-level by at least about 150 mm when compared to a horizontally stowed seat; and
  an upper extreme of the arcuate portion of the slide rail is at least about 200 mm above a linear portion of the slide rail.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
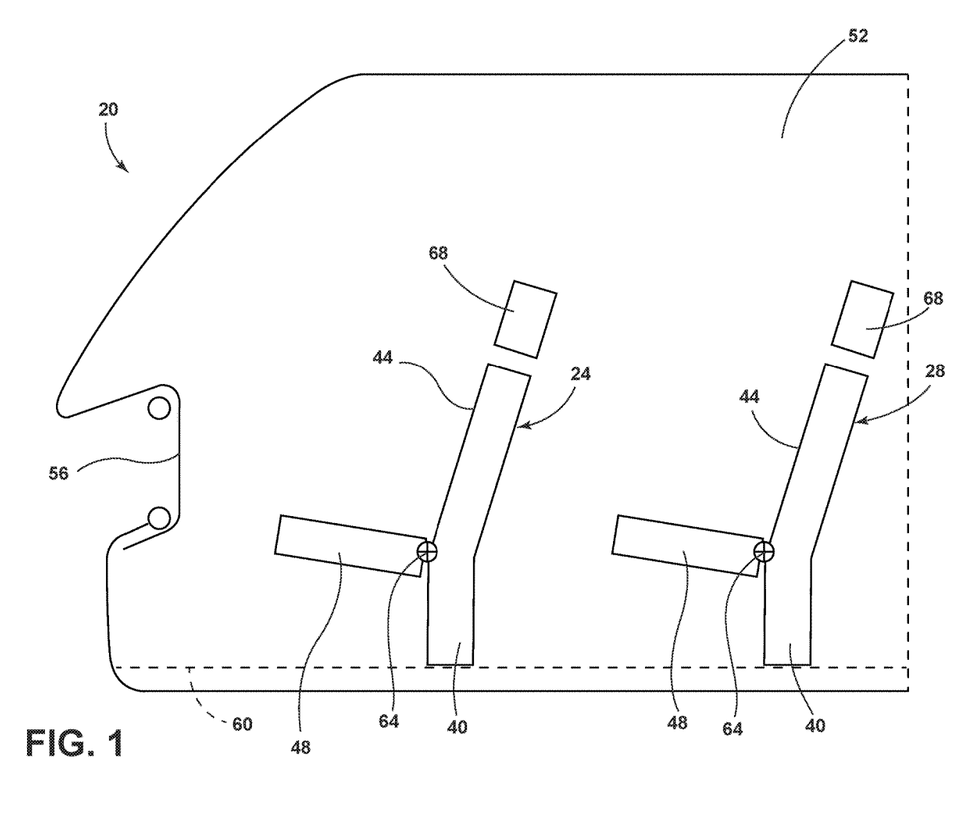
FIG. 1 is a side view of a cabin of a vehicle illustrating two forward-facing seating assemblies each in a use position.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to seating assemblies. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-8, a vehicle 20, such as a wheeled motor vehicle, may include a front first-row seating assembly 24 and a rear second-row seating assembly 28. The vehicle 20 may be an autonomous vehicle. The first-row seating assembly 24 may be a rear-facing seating assembly. The second-row seating assembly 28 may be a forward-facing seating assembly. The vehicle 20 further includes a slide rail 32 that has an arcuate portion 36. The arcuate portion 36 of the slide rail 32 may be positioned proximal an end of the vehicle 20, such as the front end, the rear end, or a side of the vehicle 20. The first-row seating assembly 24 includes a support structure 40 operably coupled to the slide rail 32, a seatback 44 operably coupled to the support structure 40, and a seatbase 48 pivotably coupled to the seatback 44. The seatbase 48 is pivotable upward toward the seatback 44. The first-row seating assembly 24 slides along the slide rail 32 to a stowed position that provides increased in-cabin storage.

Referring again to FIG. 1, the vehicle 20 shown includes a plurality of seating assemblies shown in use positions. These seating assemblies may be positioned as the first-row seating assembly 24, the second-row seating assembly 28, and have one or more additional rows of seating assemblies, such as a third-row seating assembly, a fourth-row seating assembly, and so on. Additionally, the first-row seating assembly 24 and the second-row seating assembly 28 may each be forward-facing seating assemblies, each be rear-seating assemblies, or may face opposite directions such that occupants of the seating assemblies 24, 28 are facing each other when seated in the seating assemblies 24, 28. The seating assemblies 24, 28 may be used in applications that do not involve the vehicle 20 such as, in a stadium, in a theater, in a restaurant, or any other venue that utilizes seating assemblies, particularly in venues where occupants of the seating assemblies 24, 28 may want to face one another and engage in conversation. When the seating assemblies 24, 28 are installed in the vehicle 20 they may be referred to as vehicle seating assemblies. A cabin 52 of the vehicle 20 typically includes an instrument panel 56 that is equipped with various functionalities, such as climate controls, comfort controls, entertainment controls, and storage areas. The seating assemblies 24, 28 are operably coupled to a floor 60 of the vehicle 20. The seatback 44 and seatbase 48 are operably coupled to one another by a junction 64 that enables the seatbase 48 to rotate in an upward direction towards the seatback 44. Seating assemblies 24, 28 that are arranged in this manner may be referred to as stadium seating or stadium-style seating.

Figure 2:
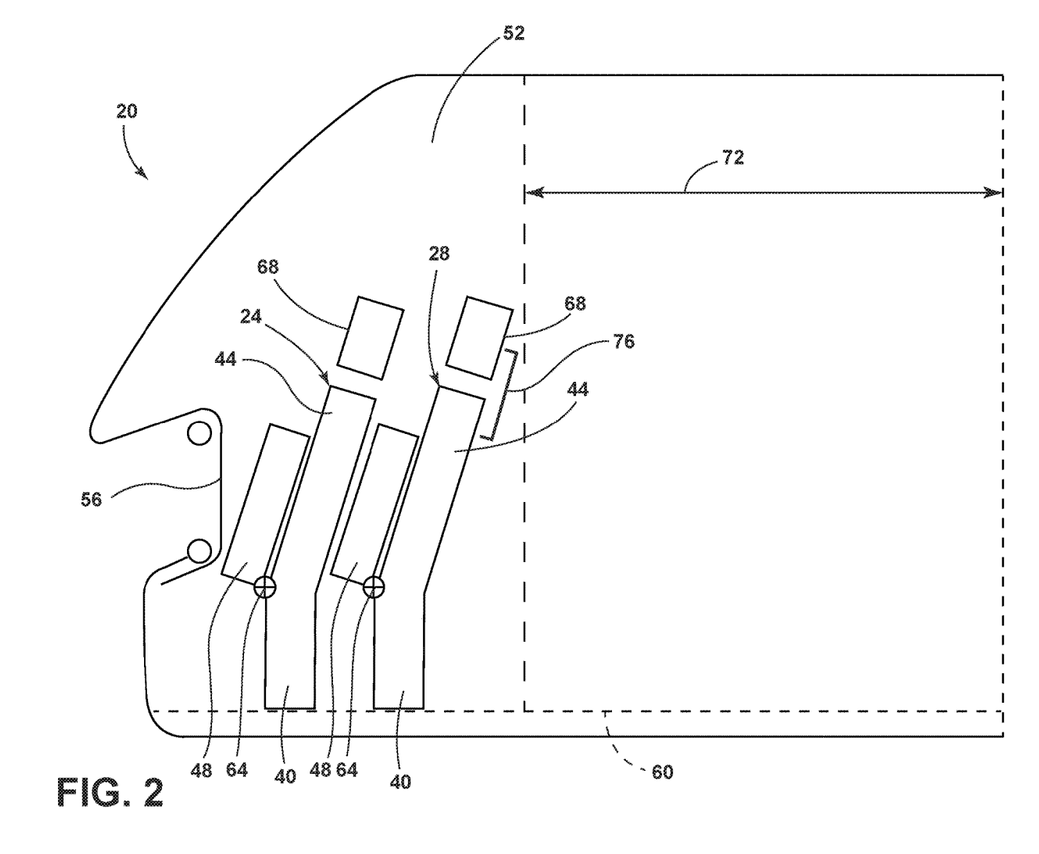
FIG. 2 is a side view of a cabin of a vehicle of FIG. 1 illustrating the two forward-facing seating assemblies in a stowed-and-stacked position.

Referring now to FIG. 2, the seating assemblies 24, 28 are each shown with their seatbases 48 adjacent and generally parallel to their respective seatback 44. The illustrated configuration of the seating assemblies 24, 28 may be referred to as a stowed-and-stacked position for the seating assemblies 24, 28. The stowed-and-stacked position may be accomplished by pivoting the seatbase 48 upward about the junction 64 toward the seatback 44 for each of the seating assemblies 24, 28. Next, one or both of the seating assemblies 24, 28 are actuated in a horizontal direction toward an end of the vehicle 20. The end of the vehicle 20 that the seating assemblies 24, 28 are actuated to may be either a front end or a rear end of the vehicle 20. The illustrated configuration may be referred to as a horizontally stowed seat. The horizontally stowed seats increase the capacity of the vehicle 20 for carrying cargo. However, the horizontally stowed seat configuration results in at least some inaccessible or unusable storage space. For example, the horizontally stowed seat configuration results in an area below the instrument panel 56 being inaccessible and/or unused. Additionally, stadium-style seats often lack the ability to adjust a pitch angle of the seatback 44. Accordingly, the rearward projection of the seatback 44, and a corresponding headrest 68, can substantially decrease a cargo space length 72 of the vehicle 20 at a headrest-level 76. The headrest-level 76 as used herein refers to a height above the floor 60 of the vehicle 20 that generally corresponds with an upper portion of the seatback 44 and the headrest 68. The decrease in the cargo space length 72 at the headrest-level 76 results in limiting the size and/or number of cargo items that may be stored in the cargo area of the vehicle 20 that have a height that falls within the headrest-level 76.

Figure 3:
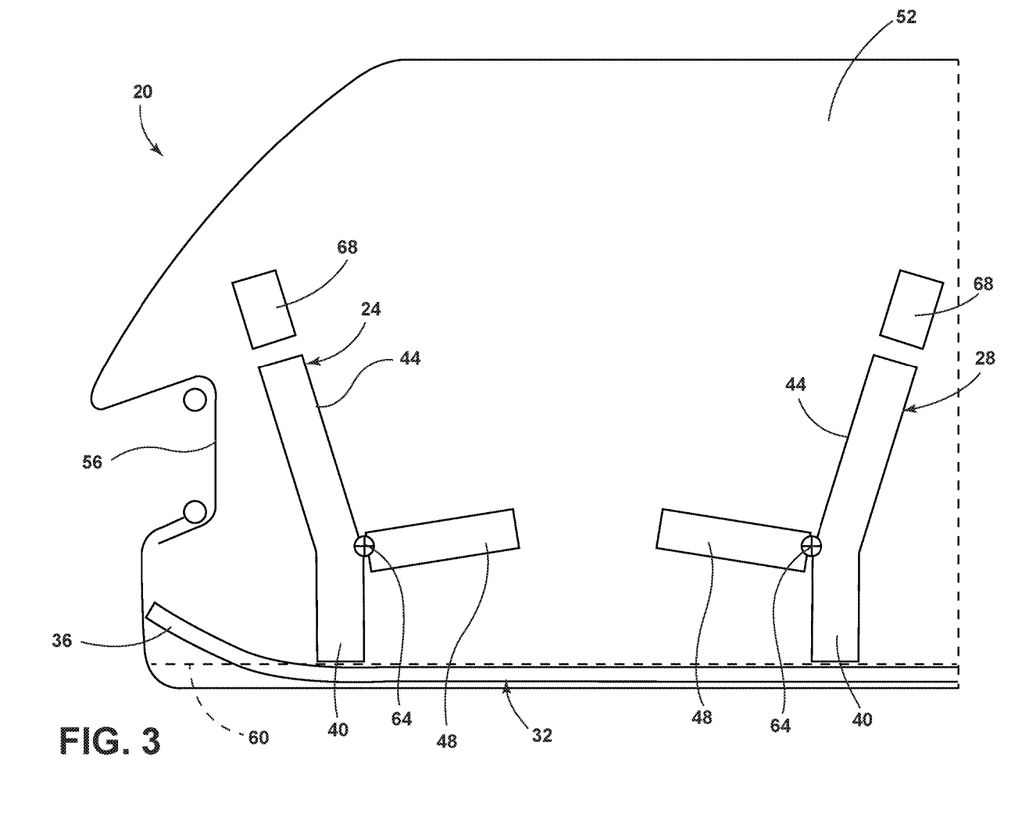
FIG. 3 is a side view of a cabin of a vehicle illustrating a forward-facing seating assembly and a rear-facing seating assembly each in a use position and having an arcuate slide rail, according to one embodiment.

Referring to FIG. 3, the first-row seating assembly 24 is illustrated as a rear-facing seating assembly. The second-row seating assembly 28 is illustrated as a forward-facing seating assembly. The illustrated configuration of the first- and second-row seating assemblies 24, 28 may be particularly useful in chauffeured vehicles 20. The chauffeured vehicles 20 may be conventional motor vehicles 20 that have a driver or may be driverless vehicles 20, such as autonomous vehicles. Applications for the chauffeured vehicles 20 include, but are not limited to, taxi services, limo services, delivery services, and the like. The first-row seating assembly 24 and the second-row seating assembly 28 are each operably coupled on a bottom end to the slide rail 32. The slide rail 32 extends longitudinally along the floor 60. The first-row seating assembly 24 and the second-row seating assembly 28 slidably engage with the slide rail 32. The slide rail 32 includes the arcuate portion 36 shown at the front end of the vehicle 20. The support structure 40 of each of the first- and second-row seating assemblies 24, 28 are operably coupled to the slide rail 32. The support structure 40 of each of the first- and second-row seating assemblies 24, 28 may be operably coupled to the slide rail 32 in any manner that permits slidable movement of the seating assemblies 24, 28 along the slide rail 32. Each of the seating assemblies 24, 28 is shown in a use position that is ready to receive an occupant.

Figure 4:
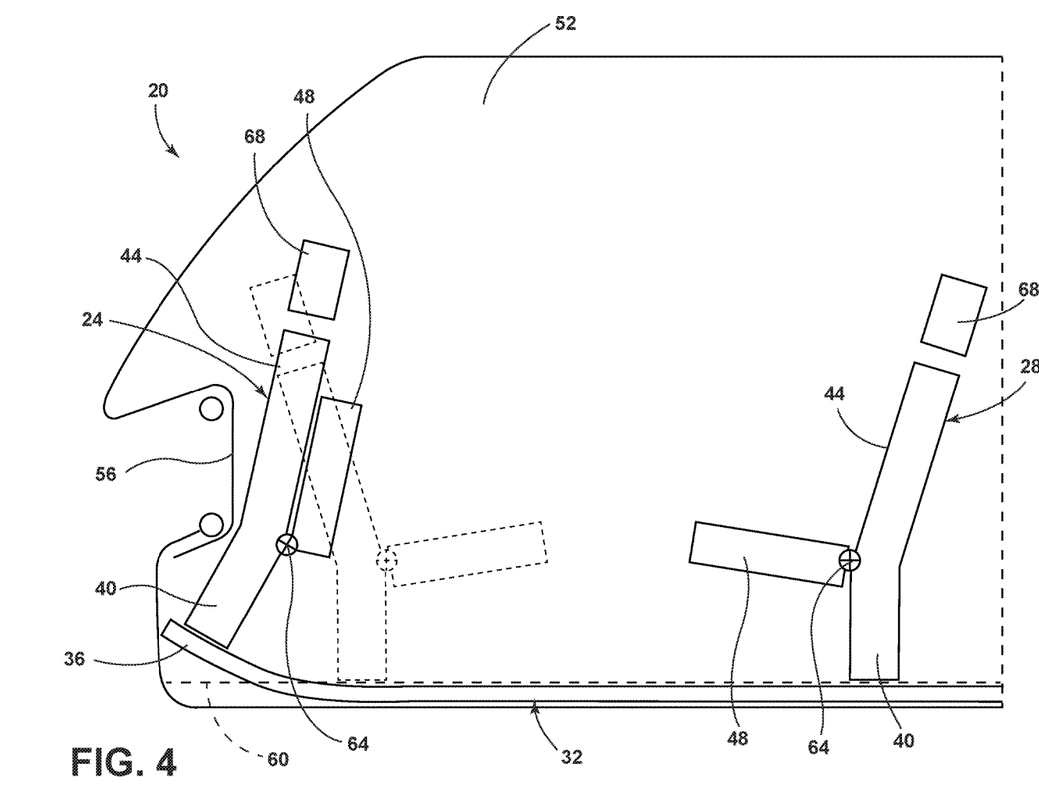
FIG. 4 is a side view of a cabin of a vehicle of FIG. 3 illustrating the forward-facing seating assembly in the use position and the rear-facing seating assembly in a stowed position that is horizontally and vertically displaced from the use position.

Referring now to FIG. 4, the first-row seating assembly 24 is illustrated in a stowed position. The use position of the first-row seating assembly 24 depicted in FIG. 3 is shown in FIG. 4 in phantom. The second-row seating assembly 28 remains in the use position depicted in FIG. 3. Transitioning the first-row seating assembly 24 from the use position to the stowed position is accomplished by pivoting the seatbase 48 in an upward direction about the junction 64 toward the seatback 44. Next, the first-row seating assembly 24 is actuated in a forward direction along the slide rail 32 and along the arcuate portion 36 of the slide rail 32. Accordingly, achieving the stowed position for the first-row seating assembly 24 requires horizontal and vertical movement of the first-row seating assembly 24. The junction 64 may be any mechanism that enables rotational and/or pivotable motion of the seatbase 48 relative to the seatback 44, such as a recliner heart. When in the forward stowed position, at least a portion of the seating assembly 24 is positioned below the instrument panel 56 of the vehicle 20. For example, the portion of the seating assembly 24 that is positioned below the instrument panel 56 may be the support structure 40. By so positioning the seating assembly 24 in the stowed position, previously inaccessible or unused space in the cabin 52 of the vehicle 20 is now being utilized to increase cargo space in the cabin 52 of the vehicle 20. The illustrated configuration of the cabin 52 of the vehicle 20 may be used to transport an occupant and cargo items that accompany the occupant. For example, the depicted configuration may be used by an occupant traveling to a transportation station, such as a bus station, a train station, or an airport and the cargo items that accompany the occupant may include luggage. Alternatively, the occupant may be returning from a shopping trip where items were purchased and will be transported with the occupant in the vehicle 20. The shopping trip may have been to a retail store, a grocery store, a craft show, or any other location where an occupant may return with cargo items that were purchased.

Figure 5:
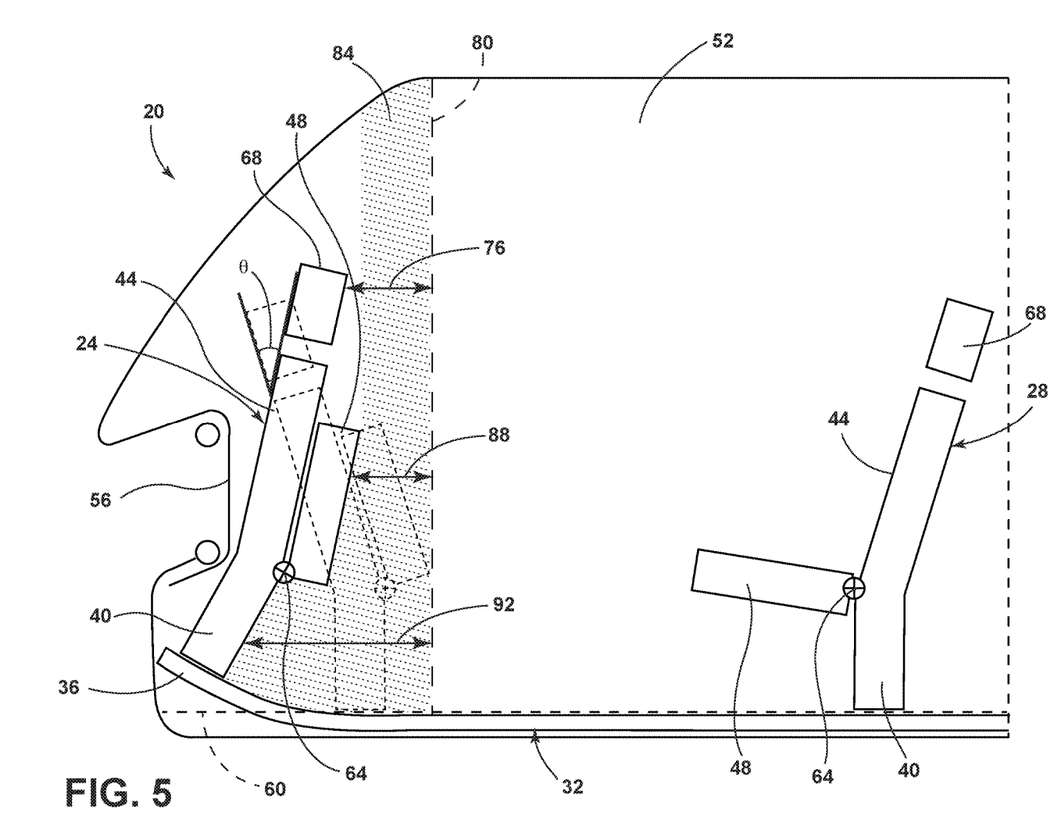
FIG. 5 is a side view of a cabin of a vehicle illustrating an increase in cargo space with the rear-facing seating assembly in the stowed position compared to an alternatively stowed seating assembly.

Referring to FIG. 5, a horizontally stowed seat reference point 80 is shown as a vertical dashed line. The horizontally stowed seat reference point 80 represents a rearward most portion of the first-row seating assembly 24 if the first-row seating assembly 24 were a horizontally stowed seat rather than a horizontally and vertically stowed seat. The horizontally stowed configuration of the first-row seating assembly 24 is depicted in phantom. The second-row seating assembly 28 remains in the use position. A shaded area 84 illustrates an increase in cargo space achieved by utilizing the horizontally and vertically stowed first-row seating assembly 24 when compared to the horizontally stowed first-row seating assembly 24.

The increase in cargo space depicted by the shaded area 84 increases the cargo space length 72 at the headrest-level 76 and a seatbase-level 88 by at least about 70 mm, at least about 90 mm, at least about 110 mm, at least about 130 mm, at least about 150 mm, at least about 170 mm, at least about 190 mm, at least about 210 mm, at least about 230 mm, at least about 250 mm, at least about 270 mm, at least about 290 mm, at least about 310 mm, at least about 330 mm, or at least about 350 mm when compared to the horizontally stowed seat. The increased cargo space depicted by the shaded area 84 increases the cargo space length 72 of the cabin 52 at a floor-level 92 by at least about 200 mm, at least about 250 mm, at least about 300 mm, at least about 350 mm, at least about 400 mm, at least about 450 mm, at least about 500 mm, at least about 550 mm, at least about 600 mm, at least about 650 mm, at least about 700 mm, at least about 750 mm, or at least about 800 mm when compared to the horizontally stowed seat.

In the depicted embodiment, the stowed position is accomplished through horizontal and vertical movement of the vehicle seating assembly 24 along the arcuate portion 36 of the slide rail 32. The horizontal movement traversed by the support structure 40 to reach the stowed position from the use position is at least about 200 mm, at least about 250 mm, at least about 300 mm, at least about 350 mm, at least about 400 mm, at least about 450 mm, at least about 500 mm, at least about 550 mm, or at least about 600 mm. The vertical movement traversed by the support structure 40 to reach the stowed position from the use position is at least about 100 mm, at least about 150 mm, at least about 200 mm, at least about 250 mm, at least about 300 mm, at least about 350 mm, or at least about 400 mm. Additionally, the seatback 44 can travel through an arc length θ of at least about 10 degrees, at least about 15 degrees, at least about 20 degrees, at least about 25 degrees, at least about 30 degrees, at least about 35 degrees, at least about 40 degrees, at least about 45 degrees, at least about 50 degrees, at least about 55 degrees, at least about 60 degrees when transitioned to the stowed position from the use position.

Figure 6:
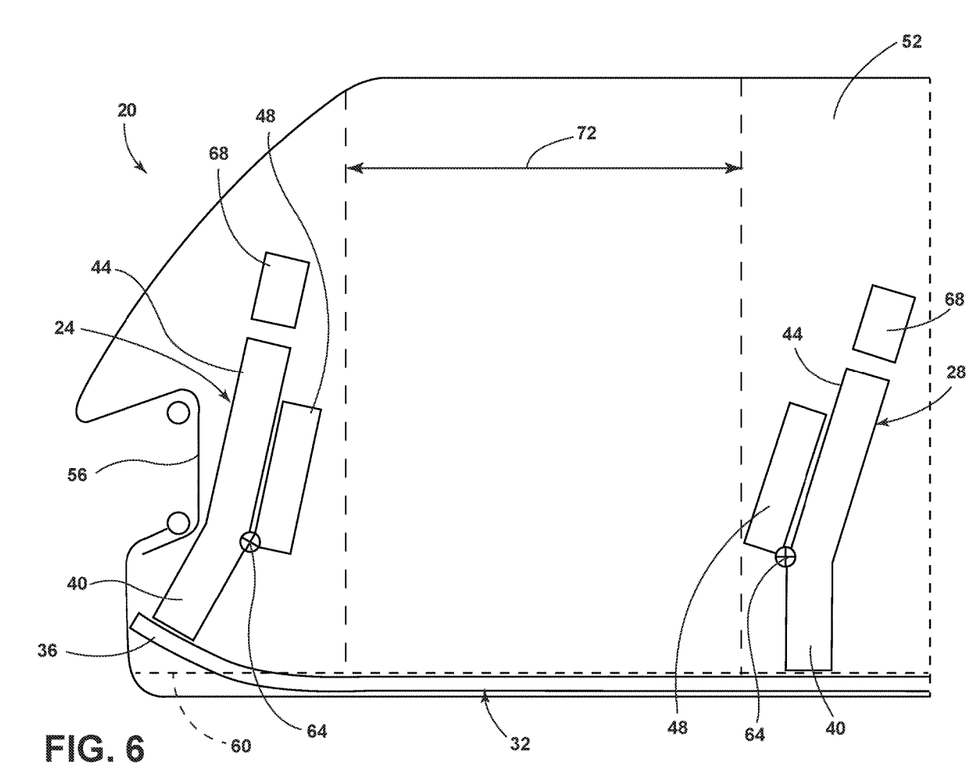
FIG. 6 is a side view of a cabin of a vehicle illustrating the forward-facing seating assembly and the rear-facing seating assembly each in a stowed position.

Referring now to FIG. 6, the first-row seating assembly 24 and the second-row seating assembly 28 are each shown in a stowed position. The available cargo space between the first-row seating assembly 24 and the second-row seating assembly 28 is depicted by two vertical dashed lines. The cargo space between the first-row seating assembly 24 and the second-row seating assembly 28 provide the cargo space length 72 that may be accessed, for example, by a side door of the vehicle 20.

Figure 7:
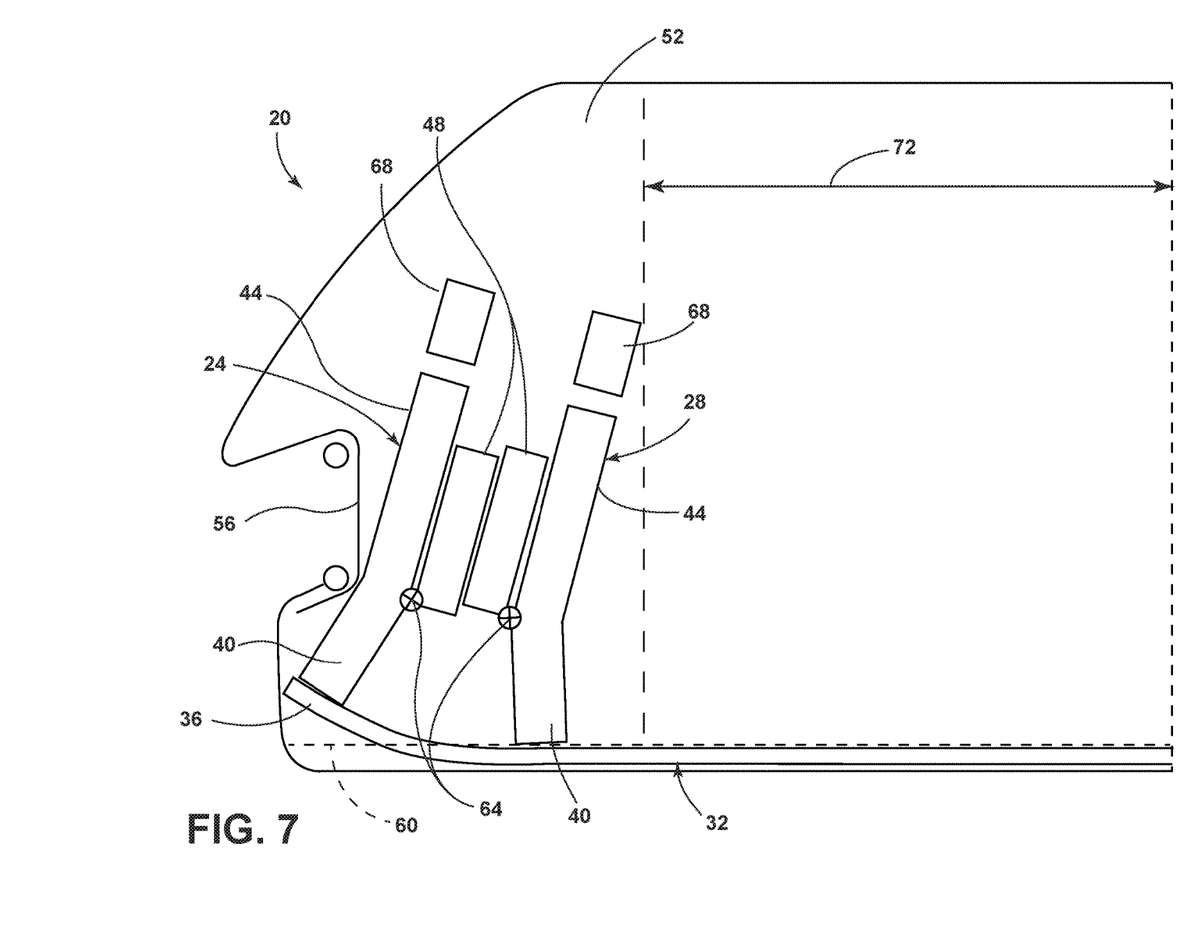
FIG. 7 is a side view of a cabin of a vehicle illustrating the forward-facing seating assembly and the rear-facing seating assembly in a stowed-and-stacked position.

Referring to FIG. 7, the first-row seating assembly 24 and the second-row seating assembly 28 are shown in the stowed-and stacked position. In the depicted embodiment, the cargo space length 72 of the cabin 52 is maximized as a result of the compact nature of the stowed-and stacked position. The compact nature of the stowed-and stacked position may be enabled by the positioning of at least a portion of the first-row seating assembly 24 below the instrument panel 56. Additionally, the compact nature of the stowed-and stacked position may be enabled by the angle assumed by the first-row seating assembly 24 as a result of the configuration and dimensions of the arcuate portion 36. Accordingly, the second-row seating assembly 28 is able to be moved farther forward along the slide rail 32 thereby increasing the cargo space length 72 of the cabin 52. In the depicted example, the vehicle 20 may be used to transport cargo rather than occupants. Such a configuration may be beneficial for use in a fleet of autonomous vehicles. For example, a user may summon one of the vehicles 20 of the fleet of autonomous vehicles to transport cargo from one location to another without accompanying the cargo along the trip. This may be useful for delivery services.

Figure 8:
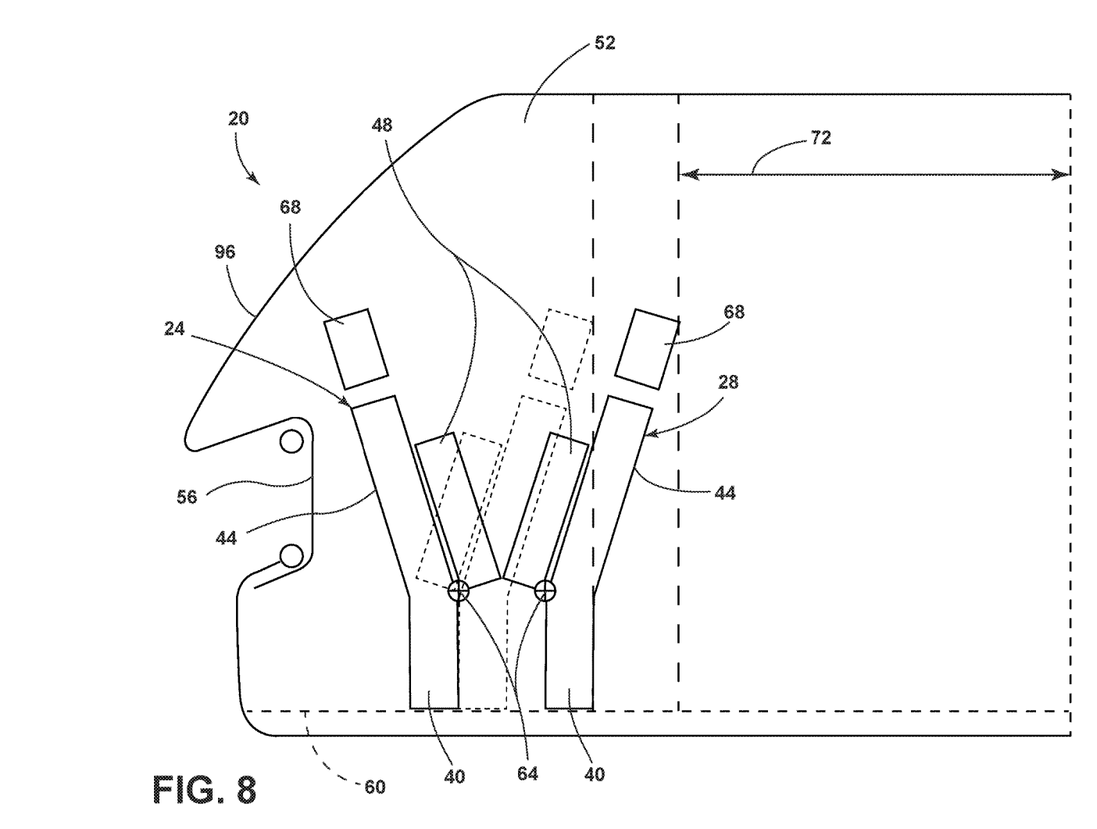
FIG. 8 is a side view of a cabin of a vehicle illustrating an increase in cargo space when the stowed position of the rear-facing seating assembly is accomplished with horizontal and vertical displacement of the rear-facing seating assembly from the use position.

Referring now to FIG. 8, the increase to the cargo space length 72 of the cabin 52 is illustrated in further detail. The forwardmost position of the second-row seating assembly 28 according to the stowed-and stacked position of the present disclosure is shown in phantom. As a comparison, the first-row seating assembly 24 is depicted as though the arcuate portion 36 of the slide rail 32 were not employed, thereby resulting in the first-row seating assembly 24 becoming a horizontally stowed seat rather than a horizontally and vertically stowed seat. The second-row seating assembly 28 is shown in a forwardmost position that is limited by the forwardmost position of the first-row seating assembly 24. The increase in the cargo space length 72 of the cabin 52 is depicted as parallel vertical dashed lines that intersect the headrest 68 of the corresponding second-row seating assembly 28 that is associated with that cargo space length 72. The increase in the cargo space length 72 that is provided by the present disclosure is clearly shown by the parallel vertical dashed lines.

Figure 9:
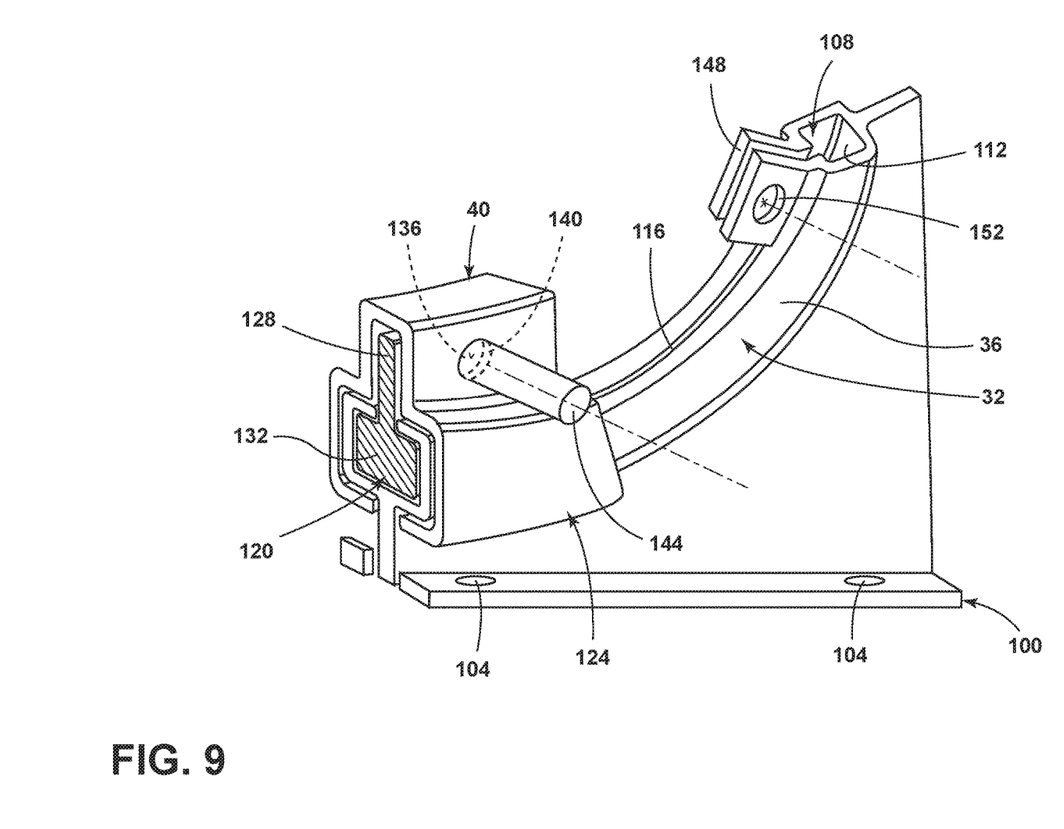
FIG. 9 is a side perspective view of an arcuate end of the slide rail illustrating an operable coupling between a support structure of the seating assembly and the slide rail, according to one embodiment.

Referring to FIG. 9, the operable coupling between the support structure 40 and the arcuate end 36 of the slide rail 32 is shown in further detail, according to one embodiment. The slide rail 32 may be operably coupled to the floor 60 of the vehicle 20 by a floor anchor 100. The floor anchor 100 may be operably coupled to the floor 60 by one or more fasteners 104. The slide rail 32 may include a semi-tubular aperture 108 that further includes a first opening 112 and a second opening 116. The first opening 112 may be larger than the second opening 116 such that a seating assembly anchor 120 may be positioned in the first opening 112 and protrude from the second opening 116 to engage with a seating assembly carrier 124. The seating assembly anchor 120 may resemble an inverted "T" structure that has a vertical post 128 operably coupled to the support structure 40 and a cross-member 132 that extends orthogonally from the vertical post 128 at an end of the vertical post 128. The vertical post 128 extends out of the second opening 116 and the cross-member 132 engages with the slide rail 32 at the first opening 112. The seating assembly carrier 124 of the support structure 40 releasably engages with the seating assembly anchor 120. The seating assembly anchor 120 includes an anchor aperture 136. The seating assembly carrier 124 includes a carrier aperture 140. The seating assembly carrier 124 may be releasably coupled to the seating assembly anchor 120 by a locking pin 144 that slidably engages with the anchor aperture 136 and the carrier aperture 140 when the anchor aperture 136 and the carrier aperture 140 have been aligned in a co-axial manner. The slide rail 32 further includes an upper pin lock 148 that is positioned at or near an upper extreme of the arcuate end 36. The upper pin lock 148 includes a locking pin aperture 152. The seating assembly anchor 120 represents the use position of the associated seating assembly 24, 28. The upper pin lock 148 represents the stowed position and/or the stowed-and-stack position. When the first-row seating assembly 24 is actuated from the use position to the stowed position, the locking pin 144 is removed from the anchor aperture 136 and the carrier aperture 140. Next, the seating assembly carrier 124 traverses the arcuate end 36 to reach the upper pin lock 148. Then, once the carrier aperture 140 and the locking pin aperture 152 are co-axially aligned, the locking pin 144 is inserted into the carrier aperture 140 and the locking pin aperture 152 to retain the first-row seating assembly 24 in the stowed position. The seating assembly anchor 120 is now free to operably couple with the second-row seating assembly 28 to retain the second-row seating assembly 28 in the stowed-and-stacked position. The seating assembly carrier 124 retains the seating assemblies 24, 28 in a vertical direction and a lateral direction while maintaining sliding capabilities in a longitudinal direction along the length of the slide rail 32.

Vehicles 20 are often utilized for transporting occupants as well as cargo items. The seating assemblies 24, 28 in the vehicles 20 occupy a considerable amount of the available cargo space in the cabin 52 of the vehicle 20. Stowing the seating assemblies 24, 28 when not in use provides increased cargo space when the additional seating capacity is not needed or desired. However, typical stowing arrangements of the seating assemblies 24, 28 tend to leave gaps or spaces between the stowed seating assemblies 24, 28 that are either unused or inaccessible. Accordingly, provided herein is an improved stowing arrangement for seating assemblies 24, 28. The stowing arrangement disclosed herein takes advantage of previously unused or inaccessible space to increase the cargo space length 72 of the cabin 52. The stowing arrangement of the present disclosure traverses the first-row seating assembly 24 through horizontal and vertical movement to provide a compact stowed-and-stacked position for the stowed seating assemblies 24, 28. The horizontal and vertical movement of the vehicle seating assembly 24 positions the support structure 40 of the seating assembly 24 at least partially below the instrument panel 56. Additionally, an upper portion of the seating assembly 24, such as the seatback 44 and/or the headrest 68, is positioned proximal a windshield 96 of the vehicle 20. By so positioning the first-row seating assembly 24 the second-row seating assembly 28 is permitted to travel an increased distance vehicle forward of the use position of the second-row seating assembly 28 along the slide rail 32, thereby increasing the cargo space length 72 of the cabin 52. To further increase the cargo space within the cabin 52 of the vehicle 20, the seating assemblies 24, 28 may be traversed along the slide rail 32 and removed from the cabin 52 of the vehicle 20 through an opening at an end of the vehicle 20 (e.g., rear liftgate).

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A seating assembly comprising:
a seatback operably coupled to a support structure; and
a seatbase pivotably coupled to the seatback, wherein the seating assembly is configured to slide along a slide rail in a floor to a stowed position, wherein the slide rail has an arcuate portion that is vertically displaced from a linear portion of the slide rail, and wherein the arcuate portion defines a terminal end of the slide rail.

2. The seating assembly of claim 1, wherein the seating assembly is a vehicle seating assembly installed in a cabin of a vehicle.

3. The seating assembly of claim 2, wherein at least a portion of the seating assembly is positioned below an instrument panel of the vehicle when the seating assembly is in the stowed position.

4. The seating assembly of claim 3, wherein the stowed position of the seating assembly increases floor-level storage for in-cabin storage by at least about 400 mm.

5. The seating assembly of claim 4, wherein the stowed position of the seating assembly increases a cargo space length of the cabin at a seatbase-level by at least about 150 mm.

6. A vehicle seating assembly comprising:
a seatbase pivotably coupled to a seatback; and
a support structure coupled to the seatback, wherein the support structure is configured to slidably engage with a slide rail, and wherein the slide rail has an arcuate portion that extends from an end of the slide rail and enables at least a portion of the vehicle seating assembly to be positioned below an instrument panel when in a stowed position.

7. The vehicle seating assembly of claim 6, wherein the stowed position is accomplished through horizontal and vertical movement of the vehicle seating assembly along the arcuate portion of the slide rail.

8. The vehicle seating assembly of claim 7, wherein the horizontal movement traversed by the support structure to reach the stowed position is at least about 200 mm.

9. The vehicle seating assembly of claim 8, wherein the horizontal movement traversed by the support structure to reach the stowed position is at least about 400 mm.

10. The vehicle seating assembly of claim 9, wherein the vertical movement traversed by the support structure to reach the stowed position is at least about 100 mm.

11. The vehicle seating assembly of claim 10, wherein the vertical movement traversed by the support structure to reach the stowed position is at least about 200 mm.

12. The vehicle seating assembly of claim 11, wherein the seatback travels through an arc length of at least about 20 degrees when transitioned to the stowed position.

13. The vehicle seating assembly of claim 12, wherein the seatback travels through an arc length of at least about 30 degrees when transitioned to the stowed position.

14. A vehicle comprising:
a slide rail having an arcuate portion; and
a first-row seating assembly comprising:
a support structure operably coupled to the slide rail;
a seatback operably coupled to the support structure; and
a seatbase pivotably coupled to the seatback, wherein the seatbase pivots upward toward the seatback and the seating assembly slides along the slide rail to a stowed position that positions a portion of the first-row seating assembly below an instrument panel.

15. The vehicle of claim 14, further comprising:
a second-row seating assembly that slides along the slide rail to a stowed-and-stacked position that is adjacent the stowed position of the first-row seating assembly.

16. The vehicle of claim 15, wherein the stowed-and-stacked position of the second-row seating assembly increases a cargo space length of a cabin of the vehicle at a headrest-level by at least about 200 mm.

17. The vehicle of claim 14, wherein the stowed position of the first-row seating assembly increases floor-level storage for in-cabin storage by at least about 400 mm.

18. The vehicle of claim 14, wherein the stowed position of the first-row seating assembly increases a cargo space length of a cabin of the vehicle at a seatbase-level by at least about 150 mm.

19. The vehicle of claim 14, wherein an upper extreme of the arcuate portion of the slide rail is at least about 200 mm above a linear portion of the slide rail.

\* \* \* \* \*